United States Patent
Jain et al.

(10) Patent No.: US 9,172,633 B2
(45) Date of Patent: Oct. 27, 2015

(54) TRAFFIC ENGINEERING SYSTEM FOR PREVENTING DEMAND DEADLOCK AND ACHIEVING UNIFORM LINK UTILIZATION

(71) Applicant: Google Inc., Mountain View, CA (US)

(72) Inventors: Sushant Jain, Sunnyvale, CA (US); Alok Kumar, Fremont, CA (US); Aspi Homi Siganporia, Saratoga, CA (US)

(73) Assignee: Google Inc., Mountain View, CA (US)

( * ) Notice: Subject to any disclaimer, the term of this patent is extended or adjusted under 35 U.S.C. 154(b) by 447 days.

(21) Appl. No.: 13/661,101

(22) Filed: Oct. 26, 2012

(65) Prior Publication Data
US 2014/0119181 A1    May 1, 2014

(51) Int. Cl.
*H04L 12/729*    (2013.01)

(52) U.S. Cl.
CPC .................... *H04L 45/125* (2013.01)

(58) Field of Classification Search
CPC .... G06F 3/0647; H04L 41/12; H04L 43/0811
See application file for complete search history.

(56) References Cited

U.S. PATENT DOCUMENTS

| | | | |
|---|---|---|---|
| 6,339,587 B1 * | 1/2002 | Mishra | 370/255 |
| 8,804,625 B2 * | 8/2014 | Akhtar | 370/329 |
| 2003/0179704 A1 | 9/2003 | Lakkakorpi | |
| 2006/0252429 A1 | 11/2006 | Chen et al. | |
| 2007/0011741 A1 | 1/2007 | Robert et al. | |
| 2007/0021086 A1 | 1/2007 | Chiu et al. | |
| 2010/0329118 A1 | 12/2010 | Adams | |

OTHER PUBLICATIONS

International Search Report & Written Opinion on PCT/US2013/066563 dated Feb. 14, 2014.
International Preliminary Report on Patentability mailed May 7, 2015 in PCT Application No. PCT/US2013/066563.

* cited by examiner

*Primary Examiner* — Chandrahas Patel
(74) *Attorney, Agent, or Firm* — Edward A. Gordon; Foley and Lardner LLP

(57) ABSTRACT

Exemplary traffic engineering solutions are described herein. According to exemplary embodiments, multiple tiered thresholds representing allocatable capacities of links in the network may be provided. The tiered thresholds may effectively limit the amount of data that a traffic engineering system is permitted to allocate on links in the network. The traffic engineering system may attempt to allocate data flows in the network according to the smallest threshold. If the network cannot accommodate the data flows according to the smallest threshold, then the next-smallest threshold may be attempted. The thresholds may be sequentially tested in increasing order until the largest threshold is attempted. If a workable threshold is found, then the data flow may be allocated to a path in the network. If the traffic engineering system is unable to accommodate the data flows at any of the tiered thresholds, then the traffic engineering system may report a failure.

20 Claims, 7 Drawing Sheets

TRAFFIC ENGINEERING SYSTEM FOR PREVENTING DEMAND DEADLOCK AND ACHIEVING UNIFORM LINK UTILIZATION

BACKGROUND

In a communications network, information (such as a data stream or data packets) may be transmitted from a source to a destination. The information may be transmitted as a data flow, which is an allocated connection that carries the information between the source and the destination along a path. Typically, a data flow has an associated size (e.g., a particular data flow sends five units of information, such as megabits, per second).

The source and the destination may be nodes in the network. A node represents a device that communicates with the network and through which information may pass, originate, and/or terminate. The nodes may be, for example: computing devices such as personal computers, phones, or tablets; servers such as email servers, data servers, or web servers; routers; switches; and other networking devices.

The data flows may be transmitted over paths in the network. A connection between two nodes is referred to as a "link," and one or more links may form a path connecting a source and a destination. The paths in the network may connect from the source to the destination using one or more transmission mediums, potentially passing through one or more nodes along the route.

The transmission mediums may be any medium suitable for transmitting information, such as copper wire, fiber optic cable, or radio waves passing through the air, among other options.

Each link is associated with a capacity, which represents the amount of data that the link is capable of accepting at any given time. When one link is unable to accommodate more data flows, subsequent data flows may be allocated to different links. Traffic Engineering relates to the problem of optimizing network routing among different potential communication paths to meet the demands of applications or nodes that transfer data in the network.

As more nodes, data flows, and links are added to the network, it becomes increasingly complicated to allocate paths for different data flows. Choosing the appropriate amount of data to allocate to a given link and balancing the bandwidth of the links in the network with the desire to route each data flow in the fastest, most efficient manner are difficult problems for traffic engineering systems.

SUMMARY

Exemplary traffic engineering solutions are described herein. According to exemplary embodiments, two, three, or more tiered thresholds may be provided, the tiered thresholds representing allocatable capacities of links in the network. The tiered thresholds may effectively limit the amount of data that a traffic engineering system is permitted to allocate on links in the network (and, cumulatively, to the network as a whole). The traffic engineering system may attempt to allocate data flows in the network according to the smallest threshold. If the network can accommodate the data flows according to the smallest threshold, the data flows may be allocated. If the network cannot accommodate the data flows according to the smallest threshold, then the next-smallest threshold may be attempted. The thresholds may be sequentially tested in increasing order until the largest threshold is attempted. If the traffic engineering system is able to accommodate the data flows at one of the tiered thresholds, then the data flow may be allocated to a path in the network. If the traffic engineering system is unable to accommodate the data flows at any of the tiered thresholds, then the traffic engineering system may report a failure.

According to one exemplary embodiment, a flow in a network may be identified. The network may have a plurality of nodes interconnected by links. Each of the links may have a maximum capacity of data that may be allocated to the think. The flow may be transmitted from a source node in the network to a destination node in the network.

A plurality of tiered thresholds may be provided. Each of the tiered thresholds may represent a threshold amount, which may be a portion of the capacity of the link that is allocatable for use by flows in the network. The allocatable capacity associated with the tiered threshold may be less than or equal to a maximum capacity of the link. The tiered thresholds may include at least three tiers of threshold amounts A path in the network between the source node and the destination node may be determined. Determining the path may involve evaluating the links in the network based on the threshold amount of one of the tiered thresholds to determine if the links are capable of forming the path at the one of the tiered thresholds. If the links are capable of forming a complete path between the source and the destination when the links are limited to the threshold amount of one of the tiered thresholds, the flow may be allocated to the path. If the links are not capable of forming the path at the threshold amount, then different threshold amounts from remaining tiered thresholds may be sequentially tested. The testing may be repeated until the path is determined or it is determined that no path can be formed using any of the tiered thresholds. If it is determined that the network cannot accommodate the flow, this failure may be reported.

In order to determine the path in the network, a graph of the network may be built. The graph may be initially empty. The graph may be populated with links whose allocatable capacity is greater than an amount of capacity demanded by the flow. The populated graph may be searched for a path between the source node and the destination node.

The traffic engineering system may allocate paths for multiple flows. If the traffic engineering system identifies that the network cannot accommodate a first flow at a first tiered threshold, but that the network can accommodate the first flow at a second tiered threshold, then the traffic engineering system may interpret this situation to mean that the network is overburdened at the first tiered threshold. Therefore, it may be unnecessary to search for paths for subsequent flows at the first tiered threshold for the links that were previously saturated at the first tiered threshold. Accordingly, the traffic engineering system may begin a search for a second, subsequent path at the second tiered threshold for the links that were previously saturated at the first tiered threshold without considering the first tiered threshold.

The flow may include a plurality of flow components. In this case, a path may be identified for each flow component individually.

In some situations, a flow may be latency sensitive. Accordingly the traffic engineering system may identify which flows are latency sensitive, and assign a path preferentially to a flow based on the flow's latency sensitivity. For example, latency sensitive paths may be allocated first, and more efficient paths in the graph may be allocated to the latency sensitive paths.

The traffic engineering system may be embodied as instructions stored on a non-transitory medium, as a method, or a system including a memory and a processor, among other possibilities. Using the above-described traffic engineering system, data flows may be distributed in a network in an efficient and effective manner, while providing room for the data flows to grow without approaching the maximum capacity of the link (if it is possible to achieve such a configuration given the constraints of the network).

DETAILED DESCRIPTION

Exemplary embodiments described herein allocate data flows to paths/links in a network according to a series of tiered thresholds. The use of the tiered thresholds allows the data flows to be spread out in the network, thereby moving data flows that might otherwise be assigned to "popular" links to less congested links, and reducing the chance that any given link in the network will overflow. If all of the data flows in the network cannot be accommodated at a particular tiered threshold, then the threshold may be increased to the next tier. Accordingly, an increasing number of data flows can be accommodated while maintaining an even distribution of data flows throughout the links in the network. As long as a data flow can be accommodated at one of the tiers, the data flow can be allowed in the network; however, the data flows are not concentrated on popular links. Accordingly, the network can be fully utilized while still limiting the chance that a link will overflow.

Data flows may be allocated to different paths in the network according to a number of different metrics. Intuitively, one might wish to send every unit of information along the shortest, fastest, and most efficient path through the network. However, this solution is not always possible, or even desirable in the long term.

Figure 1:
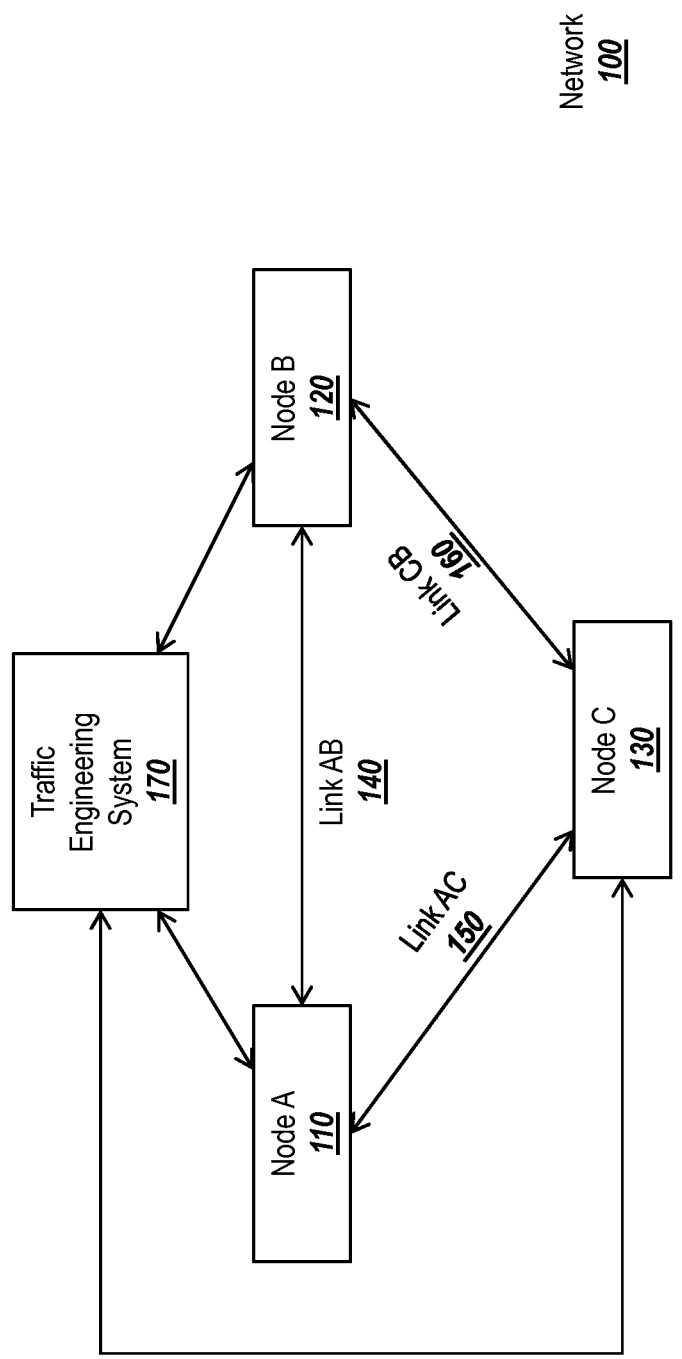
FIG. 1 depicts an exemplary communication network 100.

For example, FIG. 1 shows a communications network 100 having three nodes: Node A 110, Node B 120, and Node C 130. In this example, Node A 110 is a source node transmitting information to Node B 120, the destination node.

The path from the source to the destination may include one or more links 140, 150, 160. A link represents a connection between two nodes, which may form some or all of a path. For example, if the path is a direct connection between the source and the destination, then the path includes a single link.

More than one path may be available between a given source and a given destination. In order to determine which data flows will use which paths, a traffic engineering system 170 may communicate with the different nodes 110, 120, 130. The traffic engineering system 170 may analyze traffic flow in the network and assign data flows to particular paths. The traffic engineering system 170 is described in more detail with respect to FIGS. 4-6.

Figure 2A:
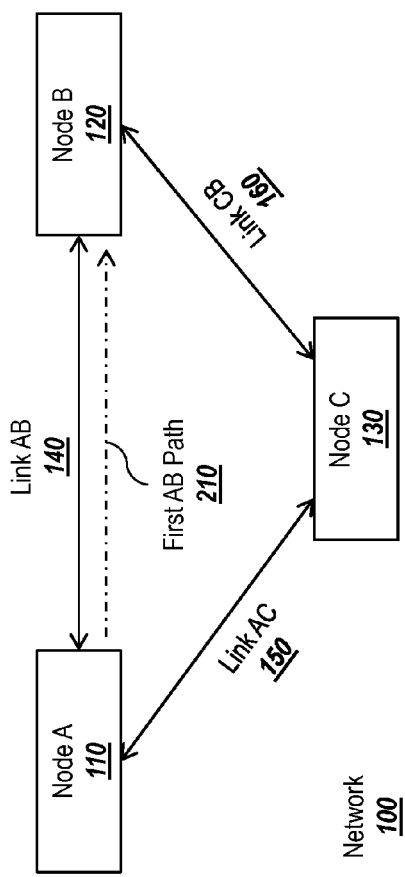
FIG. 2A depicts a first path from Node A to Node B in the network 100.

For example, as shown in FIG. 2A, a first path 210 in the network 100 begins at Node A 110 and terminates at Node B 120 without passing through any intermediate nodes. Thus, the first path 210 includes a single link: Link AB 140.

Figure 2B:
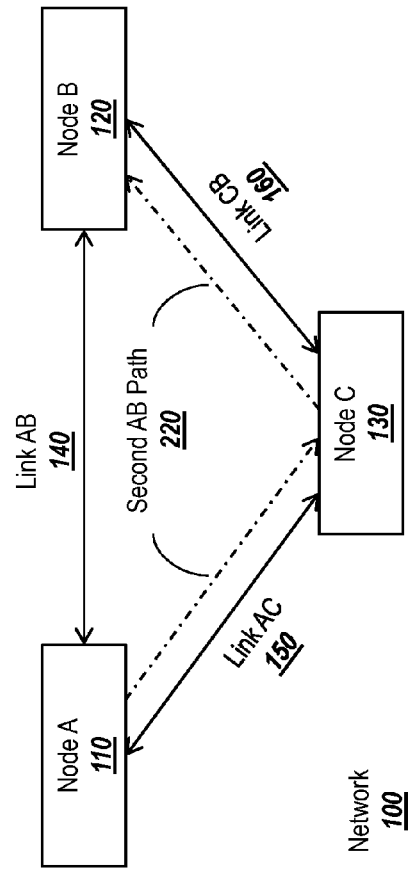
FIG. 2B depicts a second path from Node A to Node B in the network 100.

A second path 220 (see FIG. 2B) also begins at Node A 110 and terminates at Node B 120. However, the second path 220 also passes through Node C 130, and therefore includes two links: Link AC 150 and Link CB 160. Accordingly, the second path 220 may be slower and/or less efficient than the first path 210 for purposes of transmitting information between Node A 110 and Node B 120.

Figure 3:
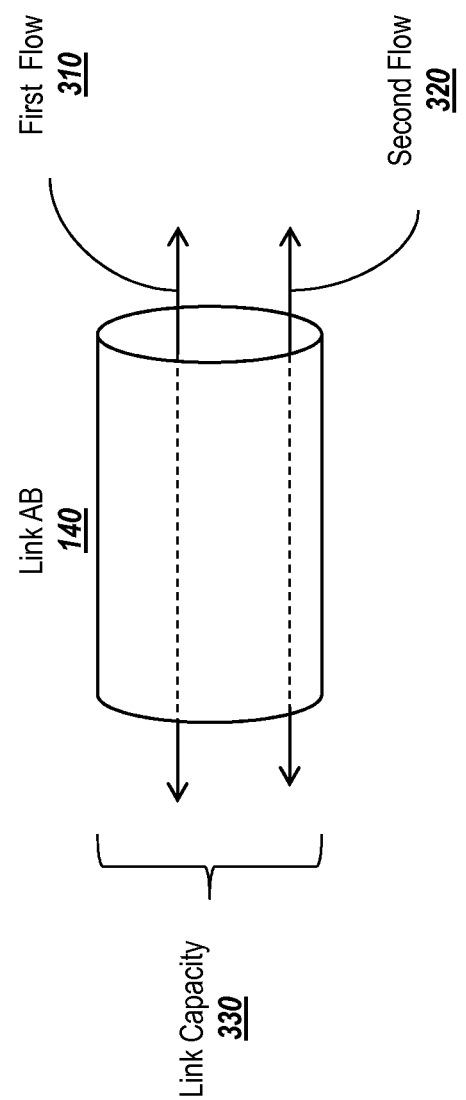
FIG. 3 depicts an exemplary link 140 from the network 100.

As shown in FIG. 3, consider a situation where Node A 110 (FIG. 1) transmits two data flows (a first flow 310 and a second flow 320) to Node B 120 (FIG. 1) along the Link AB 140. The Link AB 140 may have a link capacity 330 expressed, for example, in a number of units of information that the Link AB 140 is capable of accommodating per unit time (e.g., 6 gigabits per second or "Gbps"). In this example, the first flow 310 may require 3 Gbps, while the second flow 320 may also require 3 Gbps. In this case, the Link AB 140 is capable of accommodating both data flows 310, 320 because the capacity of the Link AB 140 is equal to or greater than the demand placed on the Link AB 140 by the data flows 310, 320 that are carried by the Link AB 140.

However, if the second flow 320 subsequently grows to 4 Gbps, the Link AB 140 can no longer accommodate both data flows 310, 320. Fortunately, another path (the second path 180) exists between Node A 110 and Node B 120 (see FIG. 2B). Therefore, one of the data flows 310, 320 may be moved to the second path 220.

Similarly, if a third data flow is added to the network (e.g., Node B 120 transmits a data flow requiring 3 Gbps back to Node A 110), then the Link AB 140 will not be able to accommodate the third data flow. The third flow may therefore be allocated to the second path 220.

However, as noted above the second path 220 may be slower and/or less efficient than the first path 210 for purposes of transferring information between Node A 110 and Node B 120. This is due to the additional latency induced by the addition of an intervening node (Node C 130) on the second path 220 as compared to the first path 210.

Nonetheless, it may be important to allocate at least some capacity on a slower or less efficient link. Consider, for example, a network utilizing Transmission Control Protocol (TCP) to transmit packets in a data flow. If a link becomes overloaded, some of the packets being transmitted on the link are dropped. When faced with dropped packets, TCP is designed to aggressively scale back the number of packets transmitted in order to avoid congestion collapse on the network.

Accordingly, if the entire capacity of a link is allocated (as in the example from FIG. 3, where the first flow 310 and the second flow 320 combine to utilize the entire 6 Gbps capacity of Link AB 140), it becomes quite easy for the link to become overloaded in the presence of a traffic spike (as in the case where the second flow 320 grows to 4 Gbps). Therefore, TCP will cause the flows 310, 320 on the link to dramatically reduce their transmission rates, which causes the connection quality and speed exhibited by the Link AB 140 to suffer.

This problem may be avoided by allocating some of the data flows to the longer second path 220. For example, the first flow 310 may be allocated to the first path 210, while the second flow 320 is allocated to the second path 220. Even though the second flow 320 takes a longer path through the network 100, excess capacity is maintained on each of the links 140, 150, 160. Accordingly, the flows 310, 320 have additional room to grow without overloading the links 140, 150, 160.

One possible solution to the problem of data flow allocation is to choose a threshold value to be applied to the links in the network. A link may be allocated data flows totaling up to the threshold value, but not over the threshold value. For example, a link may be allocated 70% of the link's total capacity (e.g., a link capable of handling 10 Gbps would be treated as a 7 Gbps link). Such a strategy provides room for the data flows allocated to the link to grow without overwhelming the link.

This solution can be problematic, however, because a traffic engineering system operating according to such a methodology may falsely report that the network is unable to accommodate additional data flows when it would actually be possible to accommodate the data flows.

For example, consider the network from FIG. 1. Assume that each of the links (Link AB 140, Link AC 150, and Link CB 160) have a capacity of 10 Gbps. If the traffic engineering system assigns a threshold of 70%, then the traffic engineering system may assign up to 7 Gbps to each link.

A first data flow from Node A to Node B might require 3 Gbps. The traffic engineering system may examine the allocatable capacities and determine that the first data flow can be accommodated on Link AB 140. This leaves 4 Gbps of available capacity on Link AB 140 (i.e., 10 Gbps at the 70% threshold gives an allocatable capacity of 7 Gbps, 3 Gbps of which is allocated to the first data flow, leaving 4 Gbps left to allocate).

If Node B then requests that the traffic engineering system accommodate a second data flow traveling from Node B to Node C and operating at 12 Gbps, the traffic engineering system will report that it is not possible to accommodate such a flow. This is because there is not 12 Gbps of allocatable capacity left on paths from Node B to Node C.

It should be noted that, in some embodiments, data flows may be broken into data flow components. A data flow component is a division of a data flow into a smaller piece. Accordingly, a 12 Gbps data flow might be broken into a 7 Gbps component, and a 5 Gbps component.

In this case, the traffic engineering system might attempt to accommodate the 7 Gbps component on Link CB 160 (which still has a full 7 Gbps of allocatable capacity). This leaves 5 Gbps that must travel from Node B to Node C. The only other available path between Node B and Node C is by following Node B to Node A over Link AB 140, and then from Node A to Node C over Link AC 150. Although Link AC 150 is unallocated and therefore has 7 Gbps of allocatable capacity, the data flow must first travel over Link AB 140, 3 Gbps of which has already been allocated to the first flow. Accordingly, only 4 Gbps is available along this path, and there is 5 Gbps remaining in the second data flow. Therefore, the data engineering system reports that the second data flow cannot be accommodated on any path in the network.

However, it can be seen that the only factor preventing the 12 Gbps second data flow from being accommodated in the network is the artificial 70% allocation threshold. In reality, Link AB 140 has 7 Gbps of capacity remaining (instead of the 4 Gbps that is reported due to the application of the 70% allocation threshold). In this situation, it would be desirable to accommodate the second data flow, since the 70% allocation threshold is merely a buffer against overflow of the network and Link AB 140 can easily accommodate an additional 5 Gbps (with 2 Gbps of capacity left to spare).

One possibility is to simply use a higher threshold, such as 80%. However, this is also a problematic solution. If the threshold is initially set to a higher amount (80% instead of 70%), more link capacity is assigned to initial data flows. As the threshold approaches 100%, the above-identified over-allocation problem (and the associated risk of link overflow) becomes more acute. Thus, certain links, such as links connecting high-traffic nodes, are used a great deal while other links may remain mostly unallocated. This concentration of data flows increases the risk that a traffic spike will cause the more popular links to become flooded.

Furthermore, there is no guarantee that a higher threshold will be able to accommodate all of the data flows in the network. In that sense, an 80% threshold is little better than a 70% threshold because the requested allocated capacity cannot be predicted, and thus there is always the chance that the requested allocated capacity will be larger than an artificial threshold.

In view of the above, exemplary embodiments provide a traffic engineering system that defines multiple tiers of thresholds. A traffic engineering system can balance data flows among different paths (and therefore different links) in the network whenever possible by applying an initial threshold, as described above. The use of the initial threshold allows the data flows to be spread out in the network, reducing the risk than any one link will overflow. If the links become saturated at the existing threshold, the threshold can be increased to the next tier, thereby accommodating more data flows while keeping the data flows spread out among links in the network as much as possible. The links may be allocated dynamically (e.g., the tiered thresholds may be increased as more data flows request paths in the network), so that balance is maintained as more data flows are added to the network.

More specifically, exemplary embodiments find paths in the network in multiple rounds. Instead of having a fixed threshold (e.g., 70%) for each link, a sequence of thresholds may be used for all links. For example, tiers such as 50%, 70%, and 100% may be defined ($T\_1=50\%$, $T\_2=70\%$ and $T\_3=100\%$).

Initially, the traffic engineering system may attempt to find paths in the network assuming all links have only ($T\_1*Link\_capacity$) available. In above-described example, the traffic engineering system may find paths assuming each link can only take up to 50% of its capacity. If the traffic engineering system is successful in finding a viable path, then the data flow is allocated to the path. If the traffic engineering system is unsuccessful, the traffic engineering system may treat each link as if the link can take up to 70% of its capacity. Because the link capacities have been increased, some new paths may become viable. The traffic engineering system may continue going to next tier until all data flows have been allocated to paths, until all the tiers have been exhausted.

This technique may help in making links more evenly utilized. For example, initially links are not more than 50% utilized if the flow demand can be met using only 50% of each link. This helps in managing network growth better and hence reducing cost.

Figure 4:
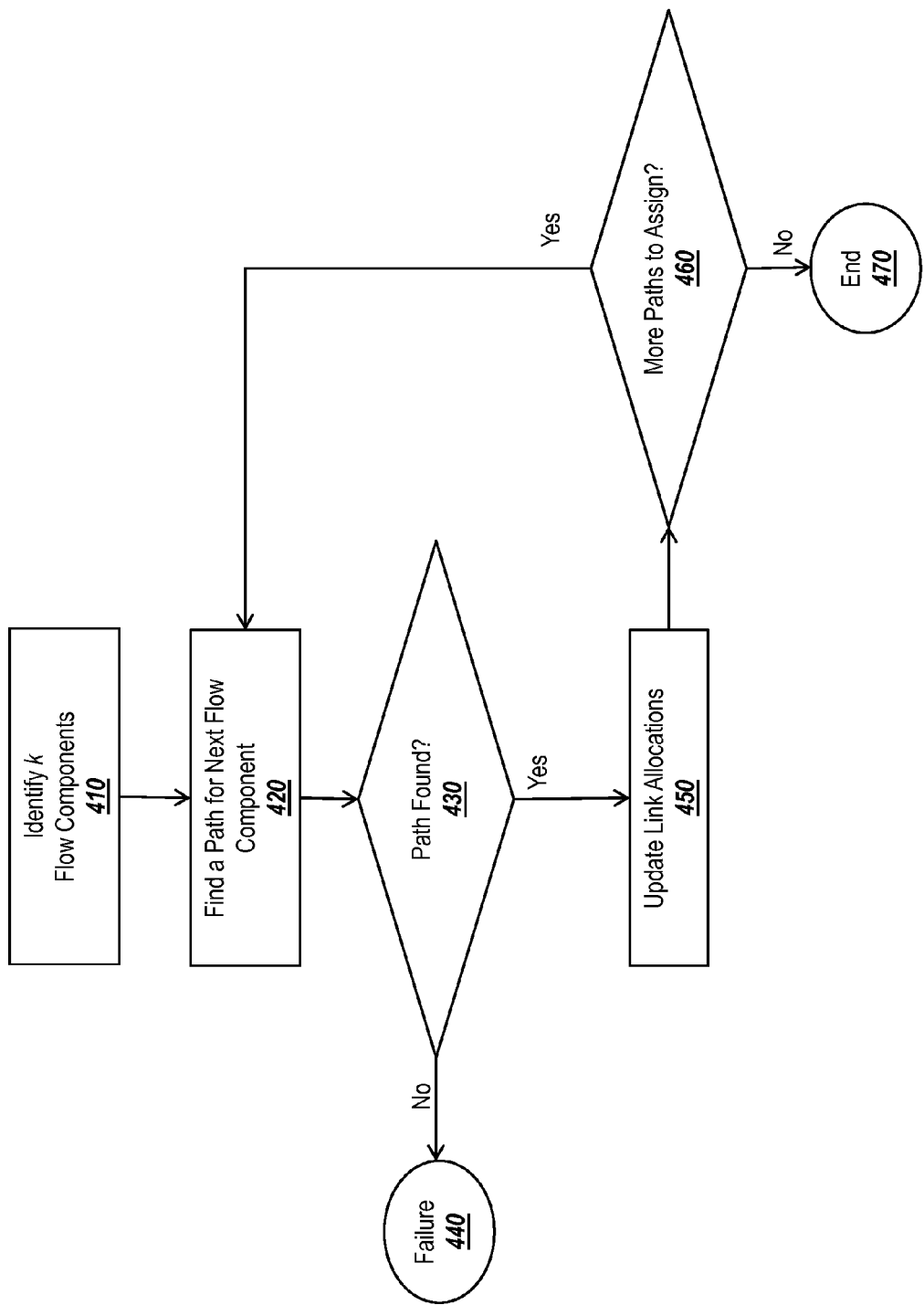
FIG. 4 is a flowchart depicting an exemplary algorithm for allocating k flow components to one or more available paths in a network.

For example, FIG. 4 is a flowchart depicting an exemplary algorithm for allocating k flow components to one or more available paths in a network.

Figure 5:
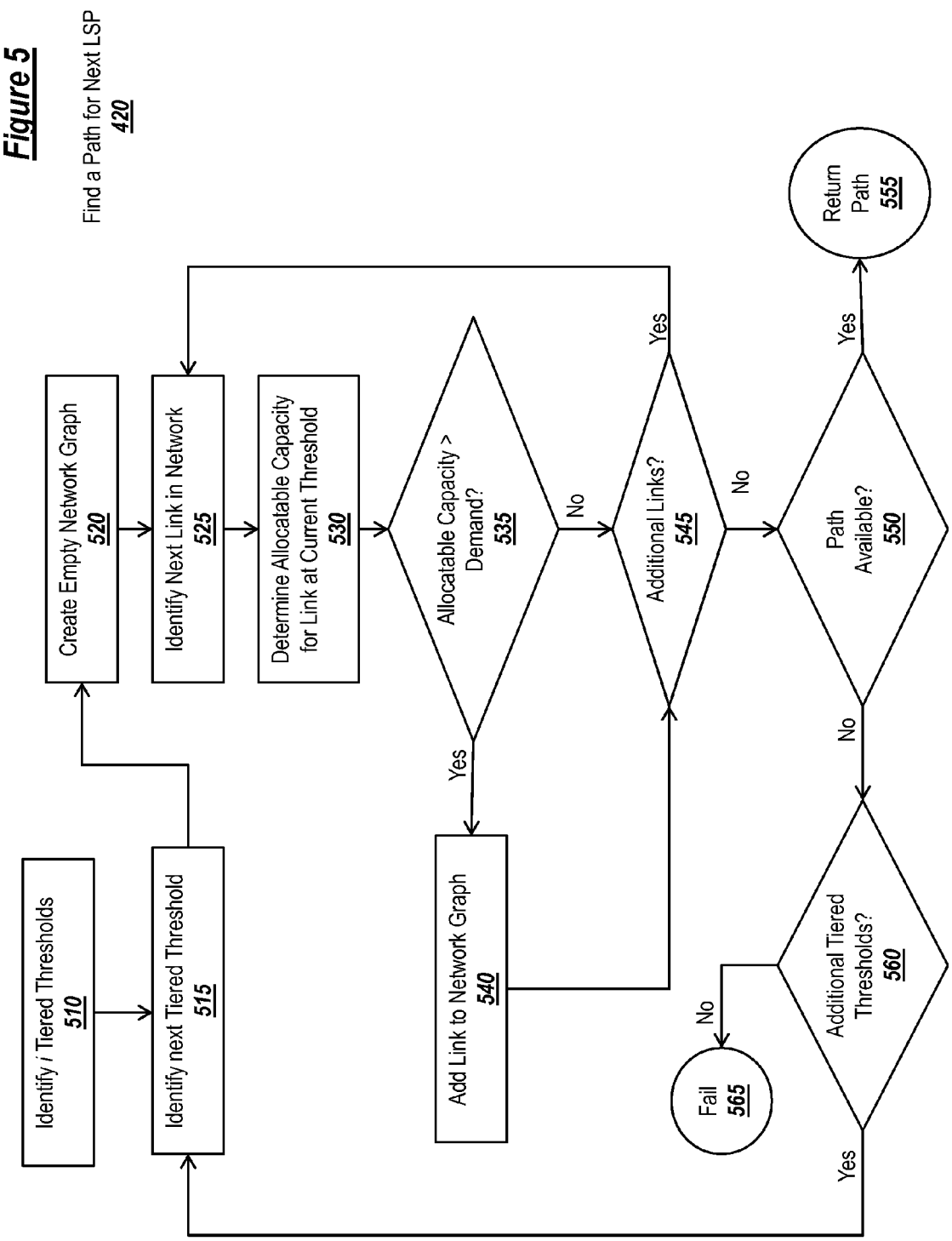
FIG. 5 is a flowchart depicting an exemplary methodology for finding a path for a given flow component in the network.

It should be noted that FIGS. 4 and 5 are presented from the perspective of a traffic engineering system dynamically allocating data flows in the network in real-time as nodes in the network request a path for the data flow. Although the description of FIGS. 4 and 5 will refer to "flow components," it should be noted that these steps may equally be applied to entire data flows. Furthermore, it is not necessary that all of the flow components belong to the same data flow.

At step 410, k flow components may be identified, where k may be an integer value. The flow components may be individual parts of a larger data flow. The traffic engineering system may break a data flow into flow components according to a predetermined algorithm. For example, the traffic engineering system may establish a maximum size of a flow component, and may break the data flow into flow components not exceeding the maximum size. Alternatively, the traffic engineering system may examine unallocated capacities among links in the network, and may break the data flow into flow components based on the amount of capacity available (e.g., if a path in the network is capable of accommodating up to x Gbps, then one of the components may be of size x).

At step 420, the traffic engineering system may determine a path for the next flow component. Step 420 is described in detail with respect to FIG. 5 below.

At step 430, it is determined whether a path was successfully found for the flow component at FIG. 4. If not, then at step 440 the traffic engineering system reports a failure. For example, the traffic engineering system may send a message to the node requesting that a path be allocated for the data flow. The message may indicate that no path is available.

If it is determined at step 430 that a path was successfully found, then at step 450 link allocations on the network may be updated. For each link in the path identified at step 420, the size of the flow component may be subtracted from the remaining allocatable capacity of the link.

At step 460, the traffic engineering system may determine whether there are additional flow components requesting to be assigned paths. If the determination at step 460 is "YES," then processing returns to step 420 and an attempt is made to find a path for the next flow component. If the determination at step 460 is "NO," then all flow components have been allocated to paths. The traffic engineering system accordingly proceeds to step 470, and processing is ended until another node requests paths for another data flow.

The steps of FIG. 4 may be represented in pseudo-code as follows.

For purposes of the pseudo-code below, assume that we are interested in finding paths for k components that correspond to the flow of interest. Each component (also known as a Label Switched Path or "LSP") may be a virtual path between the source and destination of the flow. Each of the components may have a demand of D units of transmission capabilities (i.e., the total demand of the flow is k*D). Note that it is not necessary for each component to have the same demand D, and the algorithm can be easily modified to address the situation when each component has a different demand.

An abstract variable network_state_ptr denotes a Network Topology State data structure. Further, let T[ ] be the array of tiered thresholds (e.g., T[1]=50%, T[2]=70% T[3]=100%). Let N be the number of tiers in array T [ ] (e.g., if T is {0.5, 0.8, 1.0}, then N=3). Let src be the source of flow. Let dst be the destination of flow.

The pseudo-code below finds all the available paths through the network for a given set of data flow components (LSPs). Once a path is identified, the path is assigned and the Network Topology State data structure is updated to account for the reduced allocatable capacity on the links in the path. The function FindOnePath( ), described in more detail in connection with FIG. 5, is responsible for locating a viable path for the data flow component by sequentially testing the network links at sequentially increasing tiered thresholds.

PSEUDO CODE:

```
FindAllPaths(network_state_ptr) {
    // Find a path for each of the LSP in a sequence
    for (int i = 1; i <= K; ++i) {
        path_for_LSP_i = FindOnePath(src, dst, D,
            network_state_ptr);
        if path_for_LSP_i == NULL;
            // NO MORE Paths can be found
            break;
        // Found a valid path, update link allocations
        for link in path_for_LSP_i {
            // Track that we have allocated an
            // additional demand D on each link on this
            // new found path
            network_state_ptr ->
                UpdateAdditionalLinkAllocation(link) = D;
        }
    }
}
```

FIG. 5 is a flowchart depicting an exemplary methodology for finding a path for a given flow component in the network. For example, the steps of FIG. 5 may be applied as step 420 of FIG. 4, or as an implementation for the FindOnePath( ) function in the pseudocode above.

At step 510, i tiered thresholds are identified, where i may be an integer value. The tiered thresholds may represent two, three, or more values for allocatable capacities on links in the network. The number of tiered thresholds and the value for each of the tiers may be predetermined and preprogrammed into the traffic engineering system. The tiered thresholds may be initially determined through experimentation or simulation of the network to determine optimal or workable thresholds. Alternatively, the tiered thresholds may be determined programmatically by the traffic engineering system by analyzing the current state of the network or historical data flow patterns in the network.

In one embodiment, three tiered thresholds may be utilized (i=3). The smallest threshold may be set to about 50%. By utilizing these values, a more uniform link utilization may be achieved, which results in less packet loss due to congestion.

The maximum tiered threshold may be set to 100% in order to enable the traffic engineering system to allocate all of the capacity of a link, in case it is necessary to do so in order to accommodate a data flow. Although the tiered thresholds are expressed in terms of percentages herein, it should be noted that the values for the tiered thresholds need not be represented as percentages. The values for the tiered thresholds could be expressed, for example, as a fraction, or as a multiplier applied to the maximum capacity of the link, or as a value to be subtracted from the value of the link.

At step 515, the next tiered threshold may be identified. The traffic engineering system may evaluate the tiered thresholds in ascending order. If this is the initial run through the algorithm described by FIG. 5, then the first tiered threshold may be used. However, it should be noted that a different value may be used for the first run through the algorithm described by FIG. 5 in certain circumstances. Such a scenario is described following the pseudocode at the end of this section.

In order to determine whether any viable paths exist for a given flow component, graph theory may be utilized. Accordingly, at step 520, an empty network graph may be created. The empty network graph may be populated with the nodes of the network, but without the links of the network.

At step 525, a link in the network may be identified. For example, each link in the network may be assigned an identifying number, and the traffic engineering system may traverse through the links in the network in order. Alternatively, two nodes in the network may be selected and a link between the nodes may be evaluated.

At step 530, the allocatable capacity of the selected link may be determined in view of the threshold identified at step 515. The allocatable capacity of the link may be determined by assessing the maximum capacity of the link, and applying the value of the threshold identified at step 515 to the maximum capacity to arrive at the allocatable capacity. For example, if the current threshold is 50%, and the maximum capacity of the link is 10 Gbps, then the allocatable capacity of the link is 5 Gbps.

The maximum capacity of the link may be preprogrammed into the traffic engineering system. Alternatively, the traffic engineering system may query another device, such as one of the nodes attached to the link or a server in the network, to determine the maximum capacity of the link.

At step 535, it is determined whether the allocatable capacity of the link, as determined in step 530, exceeds the amount of capacity demanded by the flow component under evaluation. If so, the link may be added to the network graph at step 540.

At step 545, it may be determined whether any links remain for evaluation. If so, processing returns to step 525 and the remaining unevaluated links in the network are evaluated. If not, then the network graph has been fully populated with links that are capable of accepting the flow component under evaluation. Processing therefore proceeds to step 550.

At step 550, a populated network graph now exists. The network graph is populated with all of the links that have sufficient capacity to accommodate the flow component under evaluation. However, even if some viable links have been found, it may be the case that the links do not connect together to form a path between the source of the flow component and the intended destination of the flow component. Accordingly, at step 550 it is determined whether a viable path between the source and destination can be formed using the viable links indentified at steps 525-545.

Many suitable algorithms exist for determining whether a path exists through a graph. For example, Dijkstra's shortest path algorithm may be used to determine whether such a path exists. Dijkstra's shortest path algorithm is but one example of a suitable algorithm for finding a path through a graph, and other suitable algorithms may also be employed.

It may be sufficient to identify that a path exists and to use the first path identified. Alternatively, the most efficient path may be identified, where efficiency is represented by a cost associated with each link. The cost may represent, for example, an amount of latency incurred as traffic is sent over the given link. The least costly path may then be selected. In some embodiments, multiple viable paths may be determined and the least costly one may be selected.

If it is determined at step 550 that a path is available, then at step 555 the identified path is returned.

If it is determined at step 550 that a path is not available at the current tiered threshold, then at step 560 the traffic engineering system determines whether there are any additional tiers for evaluation. If no additional tiers exist, then at step 565 the traffic engineering system may report a failure. If additional tiers do exist, then the next tier may be evaluated starting at step 515.

The steps of FIG. 5 may be represented in pseudo-code as follows:

```
FindOnePath(src, dst, demand, network_state_ptr) {
    // k denotes the current tier level
    k = 1;
    // Try all tiers one by one starting from the first
    // tier (i.e., k=1)
    while (k <= N) {
        // Create a graph and only include links for
        // which allocatable capacity is >= demand
        tmp_graph = new temporary graph
        // START OF FOR LOOP
        for link in network_state_ptr->all_links:
            allocatable_capacity_link = T[k] *
            Link_physical_capacity -
            Traffic_allocated_on_link_so_far
            if allocatable_capacity_link >= demand
                tmp_graph.AddLink(link)
        // END OF FOR LOOP
        final_path = find path using Dijkstra algorithm
        between src, dst on tmp_graph
        if final_path != NULL return final_path
        else
            // Using Tiered threshold of k, we were not
            // able to find a path.  Try the next
            // threshold.
            k= k + 1
    }   // END OF WHILE LOOP
} // END OF FindOnePath
```

Note that, in above scheme for finding K paths, FindOnePath( ) starts with the first tier level (i.e., k=1). However, after finding the first path, it is known the smallest tier at which links exist that allows for a viable path. Therefore, that tier value (k) can be returned from FindOnePath( ) to FindAllPaths( ). Then, in the next round instead of starting from k=1, FindOnePath( ) can start from the previous tier value k. This can significantly speed up FindAllPaths( ) when a large number of tiers exist, and/or the network is congested.

Figure 6:
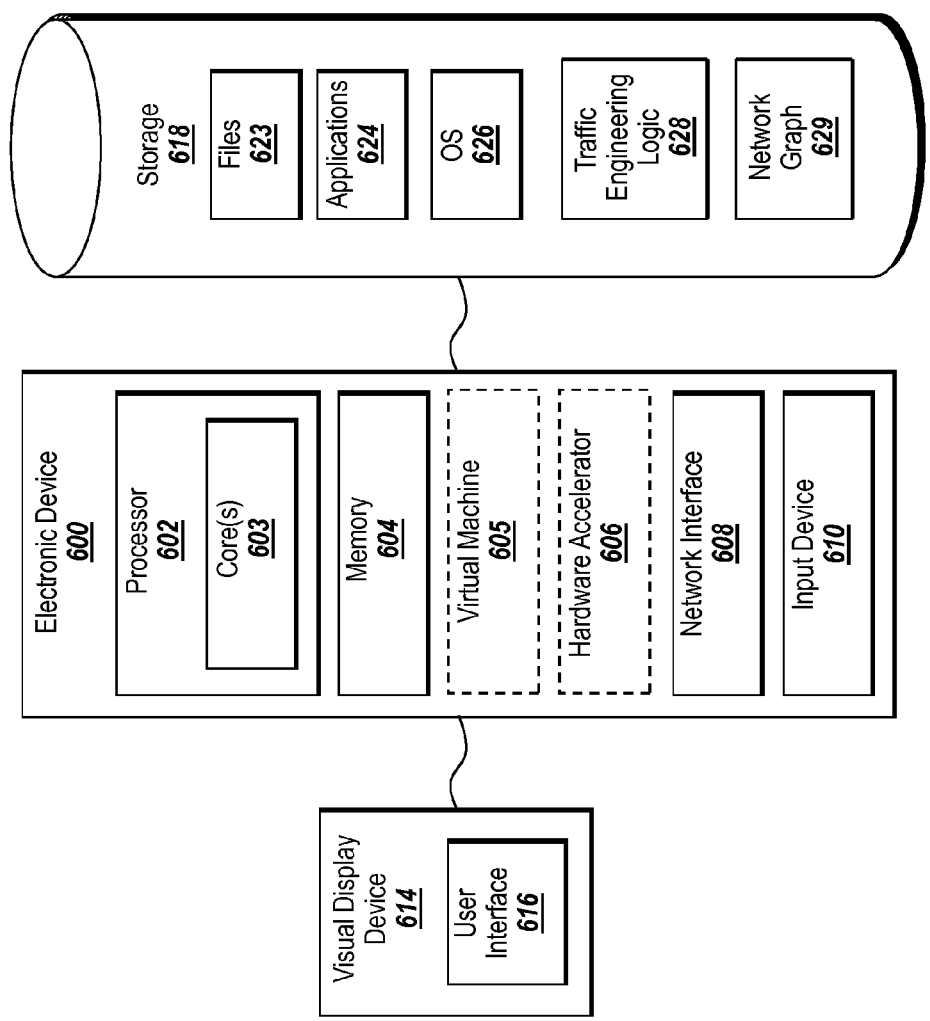
FIG. 6 depicts an exemplary electronic device 600 suitable for use with exemplary embodiments described herein.

One or more of the above-described acts may be encoded as computer-executable instructions executable by processing logic. The computer-executable instructions may be stored on one or more non-transitory computer readable media. One or more of the above described acts may be performed in a suitably-programmed electronic device. FIG. 6 depicts an example of an electronic device 600 that may be suitable for use with one or more acts disclosed herein.

The electronic device 600 may take many forms, including but not limited to a computer, workstation, server, network computer, quantum computer, optical computer, Internet appliance, mobile device, a pager, a tablet computer, a smart sensor, application specific processing device, etc.

The electronic device 600 is illustrative and may take other forms. For example, an alternative implementation of the electronic device 600 may have fewer components, more components, or components that are in a configuration that differs from the configuration of FIG. 6. The components of FIG. 6 and/or other figures described herein may be implemented using hardware based logic, software based logic and/or logic that is a combination of hardware and software based logic (e.g., hybrid logic); therefore, components illustrated in FIG. 6 and/or other figures are not limited to a specific type of logic.

The processor 602 may include hardware based logic or a combination of hardware based logic and software to execute instructions on behalf of the electronic device 600. The processor 602 may include logic that may interpret, execute, and/or otherwise process information contained in, for example, the memory 604. The information may include computer-executable instructions and/or data that may implement one or more embodiments of the invention. The processor 602 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor may include a single core or multiple cores 603. Moreover, the processor 602 may include a system-on-chip (SoC) or system-in-package (SiP).

The electronic device 600 may include one or more tangible non-transitory computer-readable storage media for storing one or more computer-executable instructions or software that may implement one or more embodiments of the invention. The non-transitory computer-readable storage media may be, for example, the memory 604 or the storage 618. The memory 604 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, or other types of RAM devices.

One or more computing devices 600 may include a virtual machine (VM) 605 for executing the instructions loaded in the memory 604. A virtual machine 605 may be provided to handle a process running on multiple processors so that the process may appear to be using only one computing resource rather than multiple computing resources. Virtualization may be employed in the electronic device 600 so that infrastructure and resources in the electronic device may be shared dynamically. Multiple VMs 605 may be resident on a single computing device 600.

A hardware accelerator 606, may be implemented in an ASIC, FPGA, or some other device. The hardware accelerator 606 may be used to reduce the general processing time of the electronic device 600.

The electronic device 600 may include a network interface 608 to interface to a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniBand, gigabit Ethernet, Myrinet) or some combination of any or all of the above. The network interface 608 may include a built-in network adapter, network interface card, personal computer memory card international association (PCMCIA) network card, card bus network adapter, wireless network adapter, universal serial bus (USB) network adapter, modem or any other device suitable for interfacing the electronic device 600 to any type of network capable of communication and performing the operations described herein.

The electronic device 600 may include one or more input devices 610, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. Note that electronic device 600 may include other suitable I/O peripherals.

The input devices 610 may allow a user to provide input that is registered on a visual display device 614. A graphical user interface (GUI) 616 may be shown on the display device 614.

A storage device 618 may also be associated with the computer 600. The storage device 618 may be accessible to the processor 602 via an I/O bus. The information may be executed, interpreted, manipulated, and/or otherwise processed by the processor 602. The storage device 618 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the invention The storage device 618 may further store applications 624, and the electronic device 600 can be running an operating system (OS) 626. Examples of OS 626 may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 618 may further include traffic engineering logic 628 for performing traffic engineering functions. The traffic engineering logic 628 may include instructions for performing the steps described in FIGS. 4 and 5. As noted above with respect to FIG. 5, the storage device 618 may also maintain a network graph that describes the allocatable capacities of links on the network.

One or more embodiments of the invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

Figure 7:
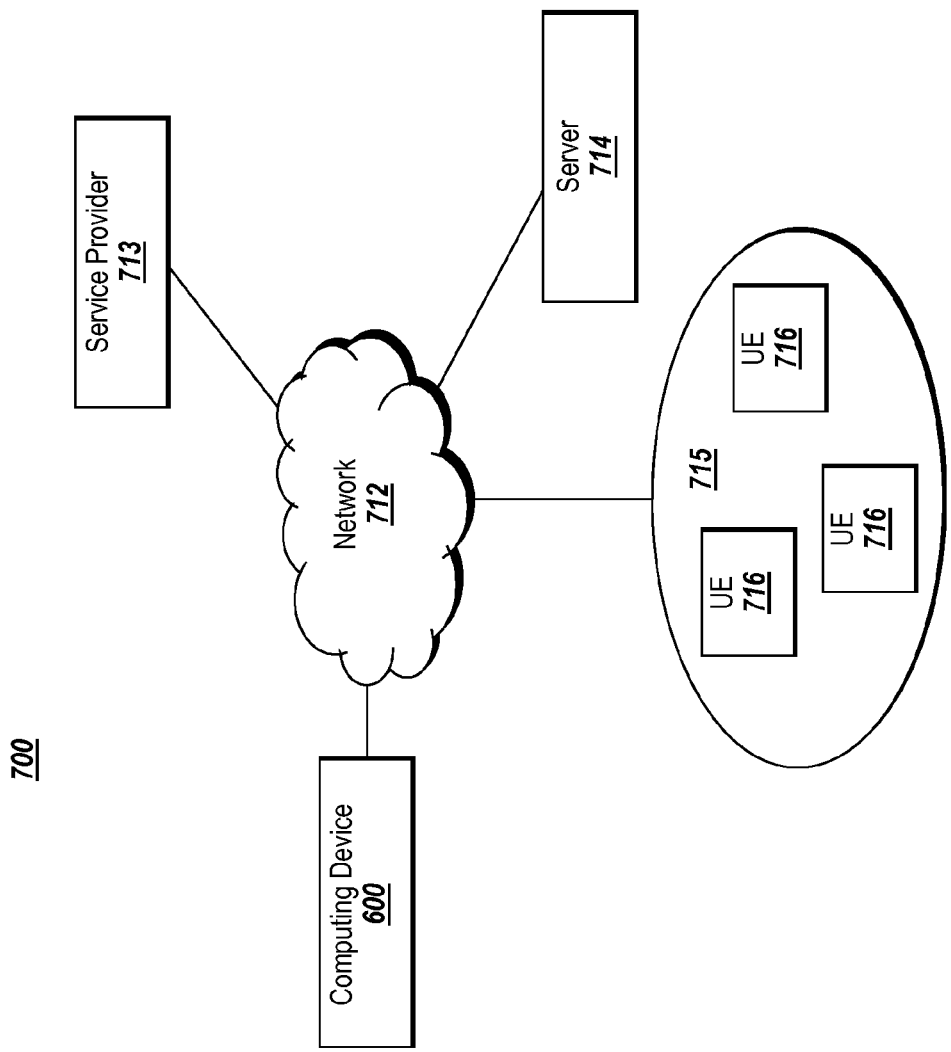
FIG. 7 depicts an exemplary distributed environment suitable for practicing exemplary embodiments described herein.

FIG. 7 depicts a network implementation that may implement one or more embodiments of the invention. A system 700 may include a computing device 600, a network 712, a service provider 713, a target environment 714, and a cluster 715. The embodiment of FIG. 7 is exemplary, and other embodiments can include more devices, fewer devices, or devices in arrangements that differ from the arrangement of FIG. 7.

The network 712 may transport data from a source to a destination. Embodiments of the network 712 may use network devices, such as routers, switches, firewalls, and/or servers (not shown) and connections (e.g., links) to transport data. Data may refer to any type of machine-readable information having substantially any format that may be adapted for use in one or more networks and/or with one or more devices (e.g., the computing device 600, the service provider 713, etc.). Data may include digital information or analog information. Data may further be packetized and/or non-packetized.

The network 712 may be a hardwired network using wired conductors and/or optical fibers and/or may be a wireless network using free-space optical, radio frequency (RF), and/or acoustic transmission paths. In one implementation, the network 712 may be a substantially open public network, such as the Internet. In another implementation, the network 712 may be a more restricted network, such as a corporate virtual network. The network 712 may include Internet, intranet, Local Area Network (LAN), Wide Area Network (WAN), Metropolitan Area Network (MAN), wireless network (e.g., using IEEE 802.11), or other type of network The network 712 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The service provider 713 may include a device that makes a service available to another device. For example, the service provider 713 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The server 714 may include a device that receives information over the network 712. For example, the server 714 may be a device that receives user input from the computer 600.

The cluster 715 may include a number of units of execution (UEs) 716 and may perform processing on behalf of the computer 600 and/or another device, such as the service provider 713 or server 714. For example, the cluster 715 may perform parallel processing on an operation received from the computer 600. The cluster 715 may include UEs 716 that reside on a single device or chip or that reside on a number of devices or chips.

The units of execution (UEs) 716 may include processing devices that perform operations on behalf of a device, such as a requesting device. A UE may be a microprocessor, field programmable gate array (FPGA), and/or another type of processing device. UE 716 may include code, such as code for an operating environment. For example, a UE may run a portion of an operating environment that pertains to parallel processing activities. The service provider 713 may operate the cluster 715 and may provide interactive optimization capabilities to the computer 600 on a subscription basis (e.g., via a web service).

Units of Execution (UEs) may provide remote/distributed processing capabilities for the applications 624. A hardware unit of execution may include a device (e.g., a hardware resource) that may perform and/or participate in parallel programming activities. For example, a hardware unit of execution may perform and/or participate in parallel programming activities in response to a request and/or a task it has received (e.g., received directly or via a proxy). A hardware unit of execution may perform and/or participate in substantially any type of parallel programming (e.g., task, data, stream processing, etc.) using one or more devices. For example, a hardware unit of execution may include a single processing device that includes multiple cores or a number of processors. A hardware unit of execution may also be a programmable device, such as a field programmable gate array (FPGA), an application specific integrated circuit (ASIC), a digital signal processor (DSP), or other programmable device. Devices used in a hardware unit of execution may be arranged in many different configurations (or topologies), such as a grid, ring, star, or other configuration. A hardware unit of execution may support one or more threads (or processes) when performing processing operations.

A software unit of execution may include a software resource (e.g., a technical computing environment) that may perform and/or participate in one or more parallel programming activities. A software unit of execution may perform and/or participate in one or more parallel programming activities in response to a receipt of a program and/or one or more portions of the program. A software unit of execution may perform and/or participate in different types of parallel programming using one or more hardware units of execution. A software unit of execution may support one or more threads and/or processes when performing processing operations.

The term 'parallel programming' may be understood to include multiple types of parallel programming, e.g. task parallel programming, data parallel programming, and stream parallel programming. Parallel programming may include various types of processing that may be distributed across multiple resources (e.g., software units of execution, hardware units of execution, processors, microprocessors, clusters, labs) and may be performed at the same time.

For example, parallel programming may include task parallel programming where a number of tasks may be processed at the same time on a number of software units of execution. In task parallel programming, a task may be processed independently of other tasks executing, for example, at the same time.

Parallel programming may include data parallel programming, where data (e.g., a data set) may be parsed into a number of portions that may be executed in parallel using, for example, software units of execution. In data parallel programming, the software units of execution and/or the data portions may communicate with each other as processing progresses.

Parallel programming may include stream parallel programming (sometimes referred to as pipeline parallel programming). Stream parallel programming may use a number of software units of execution arranged, for example, in series (e.g., a line) where a first software unit of execution may produce a first result that may be fed to a second software unit of execution that may produce a second result given the first result. Stream parallel programming may also include a state where task allocation may be expressed in a directed acyclic graph (DAG) or a cyclic graph.

Other parallel programming techniques may involve some combination of task, data, and/or stream parallel programming techniques alone or with other types of processing techniques to form hybrid-parallel programming techniques.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. For example, the invention may be practiced without the use of an idle period analyzer 160 or without determining whether the system 110 is in an idle period. Thus, non-latency-sensitive requests may be divided into sub-requests and serviced without regard to whether an idle period is in effect. Alternatively, the idle period analyzer 160 could be used without splitting the non-latency-sensitive requests into sub-requests.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

It is intended that the invention not be limited to the particular embodiments disclosed above, but that the invention will include any and all particular embodiments and equivalents falling within the scope of the following appended claims.

The invention claimed is:

1. A non-transitory computer-readable medium storing instructions that, when executed by one or more processors, cause the one or more processors to:
    identify a flow in a network, the network comprising a plurality of nodes interconnected by links, each of the links having a respective capacity, the flow being transmitted from a source node in the network to a destination node in the network;
    provide a plurality of tiered thresholds, each of the tiered thresholds representing a portion of link capacity allocatable for use by flows in the network over the respective links, wherein a first tiered threshold in the plurality of tiered thresholds represents a first portion of link capacity and a second tiered threshold in the plurality of tiered thresholds represents a second portion of link capacity that is greater than the first portion of link capacity;
    determine a path from a plurality of potential paths in the network between the source node and the destination node, wherein determining the path comprises:
        determining that there is insufficient link capacity to form any of the potential paths at the first tiered threshold by evaluating the links of the potential paths in the network based on the first tiered threshold,
        responsive to determining that there is insufficient link capacity to form any of the potential paths at the first tiered threshold, sequentially testing the potential paths at increasing tiered thresholds until it is determined that there is sufficient link capacity to form at least one path in the plurality of potential paths at the second tiered threshold, and
        responsive to determining that there is sufficient link capacity to form at least one path at the second tiered threshold based on the sequential testing, allocating the flow to one of the at least one paths at the second tiered threshold.

2. The medium of claim 1, wherein the flow comprises a plurality of flow components, and distinct paths are identified for each flow component individually.

3. The medium of claim 1, further storing instructions for: building a graph of the network.

4. The medium of claim 3, wherein building the graph of the network comprises:
    creating an initially empty graph; and
    populating the graph with links whose allocatable capacity is greater than an amount of capacity demanded by the flow.

5. The medium of claim 4, further storing instructions for: searching the populated graph for the potential paths between the source node and the destination node.

6. The medium of claim 1, further storing instructions for:
    identifying that the flow is latency sensitive; and
    assigning the path preferentially to the flow based on flow's latency sensitivity.

7. The medium of claim 1, further storing instructions for: beginning, for a subsequent flow, a search for a subsequent path at the second tiered threshold.

8. The medium of claim 1, wherein the second portion of link capacity represented by the second tiered threshold is less than a maximum capacity of at least one link in the determined path between the source node and the destination node.

9. The medium of claim 1, wherein the tiered thresholds comprise at least three tiers of threshold amounts, and a smallest tier of the tiered thresholds is set to a threshold value of about 50%.

10. A computer-implemented method comprising:
    assigning a path to a flow in a network, the flow being transmitted between a first node in the network and a second node in the network, the assigning comprising:
        identifying a plurality of tiered thresholds each representing a portion of link capacity allocatable for use by flows in the network over respective links, wherein the plurality tiered thresholds includes at least a first tiered threshold and a second tiered threshold, the first tiered threshold representing a first portion of link capacity that is smaller than a second portion of link capacity represented by the second tiered threshold;
        determining that there is insufficient link capacity to form any of a plurality of potential paths between the first node and the second node at the first tiered threshold;
        responsive to determining that there is insufficient link capacity to form any of the potential paths at the first tiered threshold, sequentially testing the potential paths at increasing tiered thresholds until it is determined that there is sufficient link capacity to form at least one path in the plurality of potential paths at the second tiered threshold; and
        responsive to determining that there is sufficient link capacity to form at least one path at the second tiered threshold based on the sequential testing, allocating the flow to one of the at least one paths at the second tiered threshold.

11. The method of claim 10, further comprising: building a graph of the network.

12. The method of claim 11, wherein building the graph of the network comprises:

creating an initially empty graph; and
populating the graph with links whose allocatable capacity is greater than an amount of capacity demanded by the flow.

13. The method of claim 12, further comprising:
searching the populated graph for the potential paths between the first node and the second node.

14. The method of claim 10, wherein the second portion of link capacity represented by the second tiered threshold is less than a maximum capacity of at least one link in the determined path between the source node and the destination node.

15. The method of claim 10, wherein the tiered thresholds comprise at least three tiers of threshold amounts.

16. A system comprising:
a memory for storing a representation of a network comprising a source node and a destination node; and
a processor configured to:
receive a request to assign a path to a flow in the network, the flow being transmitted between the source node and the destination node;
identify a plurality of tiered thresholds, the tiered thresholds each representing a portion of link capacity of one or more links between the source node and the destination node that is allocatable to flows in the network over respective links of the network, wherein a first tiered threshold in the plurality of tiered thresholds represents a first portion of link capacity and a second tiered threshold in the plurality of tiered thresholds represents a second portion of link capacity that is greater than the first portion of link capacity;
determining that there is insufficient link capacity to form any of a plurality of potential paths between the first node and the second node at the first tiered threshold by evaluating the links of the potential paths in the network based on the first tiered threshold;
responsive to determining that there is insufficient link capacity to form any of the potential paths at the first tiered threshold, sequentially testing the potential paths at increasing tiered thresholds until it is determined that there is sufficient link capacity to form at least one path in the plurality of potential paths at the second tiered threshold; and
responsive to determining that there is sufficient link capacity to form at least one path at the second tiered threshold based on the sequential testing, allocating the flow to one of the at least one paths at the second tiered threshold.

17. The system of claim 16, wherein the processor is further configured to build a graph of the network.

18. The system of claim 17, wherein the processor is further configured to build the graph of the network by:
creating an initially empty graph; and
populating the graph with links whose allocatable capacity is greater than an amount of capacity demanded by the flow.

19. The system of claim 18, wherein the processor is further configured to search the populated graph for the potential paths between the source node and the destination node.

20. The system of claim 16, wherein the tiered thresholds comprise at least three tiers of threshold amounts.

* * * * *